United States Patent [19]

Shorter

[11] Patent Number: 4,991,089
[45] Date of Patent: Feb. 5, 1991

[54] METHOD FOR ESTABLISHING CURRENT TERMINAL ADDRESSES FOR SYSTEM USERS PROCESSING DISTRIBUTED APPLICATION PROGRAMS IN AN SNA LU 6.2 NETWORK ENVIRONMENT

[75] Inventor: David U. Shorter, Lewisville, Tex.

[73] Assignee: IBM Corp., Armonk, N.Y.

[21] Appl. No.: 251,279

[22] Filed: Sep. 30, 1988

[51] Int. Cl.$^5$ ............................................. G06F 13/14
[52] U.S. Cl. ............................. 364/200; 364/222.2; 364/242.94; 364/284; 364/284.4
[58] Field of Search ... 364/200 MS File, 900 MS File, 364/513; 340/825.28

[56] References Cited

U.S. PATENT DOCUMENTS

| | | | |
|---|---|---|---|
| 4,437,184 | 3/1984 | Cork | 364/200 |
| 4,694,396 | 9/1987 | Weisshaar et al. | 364/200 |
| 4,719,566 | 1/1988 | Kelley | 364/200 |
| 4,823,122 | 4/1989 | Mann et al. | 340/825.28 |
| 4,835,685 | 5/1989 | Kun | 364/200 |
| 4,855,905 | 8/1989 | Estrada | 364/200 |
| 4,864,492 | 9/1989 | Blakely-Fogel et al. | 364/513 |

Primary Examiner—David Y. Eng
Attorney, Agent, or Firm—Richard E. Cummins; James H. Barksdale

[57] ABSTRACT

A method is described which permits a user of an Intelligent Work Station (IWS) in an SNA type network in which communication with the host processor employs LU 6.2 advanced program to program protocols and in which the host processor does not assign a dedicated virtual machine to the user during the period the user is active on the system, to notify the system of the user's current terminal address so that distributed applications programs having component parts distributed at the host and the IWS may be executed. When resident counterpart programs of distributed applications are executed by assigning each LU 6.2 conversation to an idle virtual machines from a preestablished pool of virtual machines created by the host processor, rather than to a dedicated virtual machine, the prior art methods that are based on associating the current address of the user with the address of the dedicated virtual are no longer operable. The new method does not require the user to notify the system that the user's IWS is active, since the user may want to run programs that do nor involve the host processor and may not want to be distracted with communications from the host and other users. In accordance with the new method a distributed application is provided at the terminal which is invoked by the user when a decision is made to provide the current terminal address to the host. The distributed application issues an LU 6.2 ALLOCATE verb requesting a conversation with the counterpart program resident at the host. The counterpart program is executed at the host by a virtual machine from the pool and establishes a data structure where the USERID of the user and the terminal address of the IWS are associated. The data structure is stored at a location which is scanned by all subsequent LU 6.2 conversation requests from the host and other users for a match of USERIDs. When a match occurs the associated current terminal address of the USERID is inserted into the request and sent to the IWS by the system.

5 Claims, 10 Drawing Sheets

| | |
|---|---|
| END USER | PROGRAMS FOR END USER |
| NAU SERVICES | MANAGE NETWORK<br>SESSION SERVICES<br>PRESENTATION SERVICES |
| DATA FLOW CONTROL | MAINTAIN SEND-RECEIVE<br>MODES. HIGH LEVEL<br>ERROR CORRECTING |
| TRANSMISSION CONTROL | SESSION LEVEL PACING<br>ENCRYPTION AND DECRYPTION |
| PATH CONTROL | ROUTING<br>SEGMENTING DATA UNITS<br>VIRTUAL ROUTE PACING |
| DATA LINK | ERROR CONTROL, LINK LEVEL<br>ADDRESS SEQUENCING |
| PHYSICAL | SIGNAL CHARACTERISTICS OF<br>CONNECTOR PIN ASSIGNMENTS |

FIG. 3

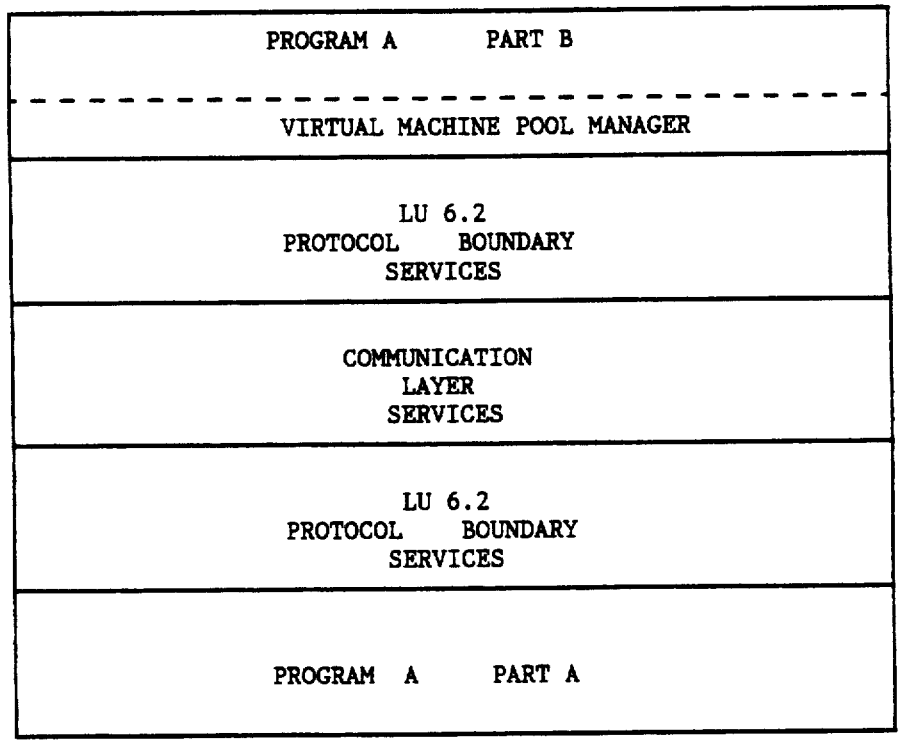

FIG. 4B

| VMNAME | TPNNAME | USERID | PCID | IDIC | CONVID |
|---|---|---|---|---|---|
| VM01 | | | | NO | |
| VM02 | | | | NO | |
| VM03 | | | | NO | |
| VM04 | | | | NO | |
| | | | | NO | |
| VMnn | | | | NO | |

METHOD FOR ESTABLISHING CURRENT TERMINAL ADDRESSES FOR SYSTEM USERS PROCESSING DISTRIBUTED APPLICATION PROGRAMS IN AN SNA LU 6.2 NETWORK ENVIRONMENT

CROSS REFERENCE TO RELATED APPLICATIONS

U.S. patent application, Ser. No. 07/261,861, entitled "Method to Provide Concurrent Execution of Distributed Application Programs by a Host Computer, and an Intelligent Work Station on an SNA Network" filed 10/24/88 and assigned to the Assignee of the present invention, is directed to a method for executing LU 6.2 conversations for distributed application programs which involves creating a pool of virtual machines at the host which are maintained in a run ready idle state until assigned by a Virtual Machine Pool Manager, to a request from a terminal executing a first part of a distributed application program, for a conversation with the second part of the distributed application program stored at the host system.

U.S. patent application, Ser. No. 07/250,598, entitled "Method to Manage Concurrent Execution of a Distributed Application Program by a Host Computer and a Large Plurality of Intelligent Work Stations of an SNA Network" filed 9/29/88 now U.S. Pat. No. 4,940,254 issued Aug. 14, 1990 and is assigned to the Assignee of the present invention, is directed to a method for providing improved communications between distributed portions of an application program that is being executed on a network simultaneously by a relatively large number of terminals, in which a pool of virtual machines is created at the host and each machine is primed (initialized) with the host resident portion of the program. When a conversation request is received at the host and assigned to a virtual machine in the pool, the machine is ready to accept the request and begin processing immediately. The pool manager monitors the use of the pool relative to anticipated demand and adjusts the size accordingly in accordance with an established algorithm.

FIELD OF INVENTION

This invention relates in general to LU 6.2 type inter-program communication methods in SNA data processing networks in which terminals are not preassigned in the system with specific end users and in particular to a method for permitting an end user to establish a current terminal address which is valid only while the terminal is active or until terminated by the user.

BACKGROUND ART

The prior art discloses a variety of computer networks. The IBM System Journal, Volume 22, Number 4, 1983 includes a series of articles devoted to a review of the IBM System Network Architecture (SNA). On page 345 of that publication a network is defined as "a configuration of terminals, controllers, and processors and the links that connect them. When such a configuration supports user applications involving data processing and information exchange and conforms to the specifications of the System Network Architecture it is called an SNA network. Essentially SNA defines logical entities that are related to the physical entities in a network and specifies the rules for interactions among these logical entities.

The logical entities of an SNA network include network addressable units and the path control network that connects them. Network addressable units communicate with one another using logical connections called "sessions." The three types of Network Addressable Units (NAUs) are the Logical Unit (LU), the Physical Unit (PU), and the System Services Control Point (SSCP) which are defined as follows;

Logical Unit (LU). An LU is a port through which end users may access the SNA network. An end user uses an LU to communicate with another end user and to request services of a System Services Control Point (SSCP).

Physical Unit (PU). A PU is a component that manages the resources of a node in cooperation with an SSCP.

System Services Control Point (SSCP). This is a focal point for configuration management, problem determination and directory services for end users. SSCPs may have sessions with LUs and PUs. When such a session occurs, the LU or PU is in the domain of the SSCP. In addition to sessions with LUs and PUs, SSCPs may also communicate with each other to coordinate the initiation and the termination of sessions between Logical Units and in different domains."

From the hardware standpoint, a simple network comprises a host system having a processing unit and a plurality of remote terminals that are assigned to individual users. The remote terminals are selectively connectable to the host system through one or more communication links. These links may comprise merely a coaxial cable, a dedicated telephone line, or in some cases, a satellite communication link.

The host processing unit most always has an operating system which supports the creation of a large number of virtual machines or the functional equivalents, each of which is assigned, on request, to an end user. A virtual machine processes tasks for the assigned end user, by time sharing the host processor hardware of the host system. Some hosts systems may include more than one hardware processor so that true simultaneous processing occurs at the host since a plurality of processors are running in parallel. More often, there is merely one hardware processor that "concurrently" runs data processing tasks for the virtual machines by a time sharing technique. This is transparent to the end users at the terminals.

In prior art networking systems, a user of the system is assigned a USERID by the system administrator at the time the user is first authorized to use the system. The user is also assigned a Password at that time, which is required to be presented to the system each time the User "Logs On" to the system. The system administrator has entered the user's USERID, and Password into the system. If the information that is provided by the Log On process does not match the information entered into the system by the administrator, the user in not allowed access to the system. If the information is correct then the system allows access. As part of the Log On process the User is permanently assigned the exclusive use of a Virtual Machine by the system until a Log Off process is completed. The name given to the assigned Virtual machine is the USERID of the user that is Logging On. The system address of the terminal being used by the user for the Log On process is also transmitted to the assigned virtual machine and stored as part of the Log On process. Any subsequent communications intended for the user, require only the user's USERID as part of the massage address. The message is transferred to and processed by the assigned virtual machine and sent to the user at the terminal address stored by the dedicated virtual machine at the time of Log On.

This method of assigning a user's USERID as the name of the virtual machine that has been assigned to that user and storing the user's current terminal address in the assigned virtual machine, avoids the address conversion problem of converting USERIDs to terminal addresses in order to deliver a message addressed to a specified USERID. With this prior art approach the system only requires the USERID of the intended recipient in order to deliver a message. When a message is received for a user it is stored and a check is made to determine if the message can be delivered immediately. If the user is on line at the time the system receives the message, the system will indicate this after scanning a relative short list of virtual machines that were dedicated to specific users at Log On, and proceed accordingly to deliver the message by causing the one dedicated virtual machine having the name USERID to transmit the message to the user's current terminal address stored by that dedicated virtual machine. Otherwise, as part of the Log On process, the system checks the list of undeliverable messages for messages addressed to the user and advises the newly signed on user that there is a waiting message stored in the system.

Two general types of terminals are employed in data processing networks. The first is referred to as a "dumb terminal" in that it comprises merely a keyboard and a display device and little or no processing capability other than that required to make a connection with the host system. The second type of terminal is referred to as an Intelligent Work Station (IWS) and is provided with its own processor unit, Operating System and supporting peripheral devices. The terms IWS and Personal Computer (PC) are often used interchangeably. With the ready availability of PCs having very attractive price performance characteristics, most new networks are implemented with IWS type terminals and many of the older networks are being modified with the replacement of dumb terminals with IWS type terminals.

Providing each end user on the network with its own processing capability relieves the host CPU from doing many of the data processing tasks that were previously done at the host. The nature of the tasks that are processed by the host CPU therefore has changed and more sophisticated applications such as electronic mail and electronic calendaring are now implemented on the network under the control of the host system. Both of these applications involve what is referred to as distributed application programs, in that one part of the application program is resident on the host system and another is resident on the IWS terminal.

Many of the current data processing networks are designed in accordance with the IBM SNA architecture which was first described in 1974. Since then various new functions and services have been added. As suggested earlier, SNA networks can be viewed as a plurality of nodes interconnected by data links. At each of these nodes, path control elements send information packets, referred to as Path Information Units (PIUs), between resource managers called Logical Units. The logical connections of the paths are called a session. A transport network for data is therefore defined by the path control elements and the data link control elements.

Nodes can be connected by a plurality of links and comprise a plurality of LUs. Various types of LUs sessions and protocols have been established within the framework of the SNA architecture. There are three general classes of sessions. The first class is unspecified by SNA. The second class involves terminals and the third involves program to program communication. For example LU 6 provides SNA defined inter-program communication protocols which avoids the limitations of terminal LU types such as LU 2 and LU 7. LU 6.2 is referred to as Advanced Program to Program Communication or APPC protocols.

Logical Units are more than message ports. LUs provide operating system services such as program to program communication involving one or more local programs. Each application program views the LUs as a local operating system and the network of loosely coupled LUs connected by sessions as a distributed operating system.

The LU allocates a plurality of resources to its programs, which are dependent on the particular hardware and its configuration. Some of the resources that are made available are remote while others are local, i.e., associated with the same LU as the application program. The sessions are considered local resources at each LU, but are shared between particular LUs.

The control function of an LU is resource allocation. Programs ask one for access to a resource. Sessions which carry messages between LUs or programs running on LUs are considered shared resources. A session is divided so that a plurality of conversations are run serially.

Two LUs connected by a session have a shared responsibility in allocating sessions to application programs for use as "conversations." The application programs are therefore sometimes referred to as "transaction programs."

The successful connection between LUs occurs as a result of a common set of protocols which function first to activate a session between two LUs and second to facilitate the exchange of message data.

The SNA format and protocol reference manual designated SC30-3112, published by the IBM Corporation describes SNA by describing, for example, with programming language declarations, the format of messages that flow between network entities and the programs that generate, manipulate, translate, send and return messages.

The SNA transaction program reference manual for LU 6.2 referred to as GC30-3084, published by the IBM Corporation defines the verbs that describe the functions provided by the implementing products.

Intelligent work stations that are connected to a SNA type network and employ an LU 6.2 protocol to process an application program that is distributed between the IWS and the host system operate efficiently so long as the operating system of the IWS does not run more than one application concurrently at the terminal. However, if the IWS is operating under an operating system such as OS/2, which allows an IWS such an IBM PS/2 personal computer to run concurrent application programs which are distributed, the advantage of concurrent operation on the PS/2 is lost. The advantage is lost because at the host, the separate transactions which are run concurrently at the terminal become serialized. The serialization of the transaction occurs because the host creates only one virtual machine that is permanently associated with the user ID and the specific terminal as long as the session is active.

In order to avoid the serialization at the host, the second application being run at the terminal has to be run with a different user ID in order to have a separate virtual machine established at the host that will be dedicated solely to the second application.

The invention described in the cross-referenced application Ser. No. 07/261,861 is directed to a method to permit two or more distributed application programs that are being run concurrently on one intelligent work station of a data processing network to be executed on separate virtual machines created by the host system to prevent the applications from becoming serialized at the host and to allow each to be run concurrently with the other on both the host and the terminal.

With the method of the cross-referenced application, the host system creates a plurality of virtual machines (VMs) that are brought to a run ready state prior to and in anticipation of being assigned to a distributed application program for processing a task which has been defined in said distributed application program, part of which is resident on the host system and the companion part of which is resident on one of the IWS end user terminals. The pool of run ready VM machines are preferably created automatically at the time that the host system is initialized under the control of a pool manager, which is a program resident on the host system, whose other main function is to assign an idle VM machine from the pool in response to an end user request that identifies a distributed application program, a previously assigned Logical Unit name and a USERID. The VM is assigned only for a period of time required to complete one LU 6.2 conversation. At the end of the conversation the VM machine is returned to the pool for subsequent assignment to another, possibly different, application program and user. The method allows two distributed application programs being executed concurrently on the IWS to run concurrently on the host in two separate virtual machines even though the conversation requests have the same USERID.

While the above system improves the processing of distributed application programs, it requires a new method to determine the current terminal location of an on-line user. It will be recalled that in the prior art method, the dedicated virtual machine that was named the USERID of the current user, was used to store the current terminal address of the user. This dedicated machine has effectively been eliminated and replaced by a pool of virtual machines which are not permanently associated with either one user or one terminal address. Since virtual machines from the pool are assigned dynamically to process relatively short LU 6.2 type conversations between the host and the terminals, and then returned to the pool, it is not practical to use the prior art method of determining the current terminal address of an active user by naming an assigned virtual machine from the pool with the USERID of the user and storing the user's current terminal address in this virtual machine.

The method of the present invention, allows the current terminal address of a specific user in an SNA system employing a pool of virtual machines organized according to the teaching of the above Cross-referenced applications to be determined only after the intelligent workstation terminal user has decided that the host system or other system users may communicate to the user's intelligent workstation.

SUMMARY OF THE INVENTION

In accordance with the method of the present invention, a specific user of an intelligent work station such as an IBM PS/2 type personal computer, running a multi-tasking type operating system such as the IBM OS/2 operating system and which is connected to an SNA network having a host processing system employing LU 6.2 program to program communication protocols decides when the host system or other users on the system may deliver messages addressed to the USERID of the specific user employing those protocols. The method establishes a distributed Sign On application program in the system with one part of the program resident on each IWS and the other part resident at the host processor. When the IWS user decides that communication with the host processor and other users is in order, the Sign On distributed application program is evoked on the IWS. The Sign On program displays a screen to the user prompting for the user's USERID and the password that was assigned when the user was authorized to use the system. The workstation then issues an LU 6.2 ALLOCATE verb requesting a conversation with the counterpart program that is specified in the ALLOCATE. The Part B of the Sign On program, which has the name "BEGIN", is executed on the host processor to process the conversation being requested by the ALLOCATE. The Begin program calls a program which is named VMPMID, that is a component of the Virtual Machine Pool Manager (VMPM) program. A Identification Control Block Entry (ICBE) is created by this component which functions to store USERID and Terminal ID information in respective fields along with a pointer to a following ICBE if one exists. A DEALLOCATE verb is then issued by the BEGIN counter part program and the conversation is terminated with a message to the user indicating a successful conclusion. The method further stores the chain of ICBEs in storage at the host processor which is accessible to any program that is run on a virtual machine that is a member of the pool of virtual machines. The method also requires that any distributed application program that originates at the host processor and intends to issue an allocate verb to initiate a conversation involving a specific user, first scan the ICBE chain to determine if the user is accepting messages, and if so the current system address where these messages should be sent in accordance with LU 6.2 protocols.

The user is allowed to revoke the permission initially granted by evoking the Sign On program again and selecting the end option. An ALLOCATE verb is then issued by the terminal, requesting a conversation with a counterpart application program called "END" which is another component program of the VMPM program. The ALLOCATE transmits sufficient information to allow the END component program to locate the appropriate ICBE in the chain of ICBEs and cause it to be deleted. The END program then issues a DEALLOCATE back to the terminal, which display a message to the user indicating a successful completion of the permission revoking task.

It is therefore an object of the present invention to provide an improved method for executing distributed applications in a data processing network.

A another object of the present invention is to provide an improved method for processing distributed application programs in an SNA type data processing network in which a pool of virtual machines is established at the host processors.

A further object of the present invention is to provide an improved method for processing distributed application programs in an SNA type network employing LU 6.2 protocols, whereby an end user determines when messages addressed to the user's USERID from other system users may be delivered to the user.

A still further object of the present invention is to provide an improved method for identifying the current terminal address of an end user in an SNA network which employs LU6.2 protocols in which the host processor does not create a virtual machine that is dedicated to one user at one terminal.

A still further object of the present invention is to provide a method for identifying the current address of an intelligent workstation being operated by a specified user of an SNA network employing LU 6.2 protocols in which the specified user is not required to execute prior art log on procedures in order to use the workstation.

Objects and advantages other than those mentioned above will become apparent from the following description when read in connection with the drawing.

DESCRIPTION OF THE DRAWING

FIG. 3 illustrates the organization of the various layers of programming that are involved in the SNA network of FIG. 1.

FIGS. 4A and 4B show the relationships between parts of a distributed application program and network programs.

DESCRIPTION OF THE PREFERRED EMBODIMENT

Figure 1:
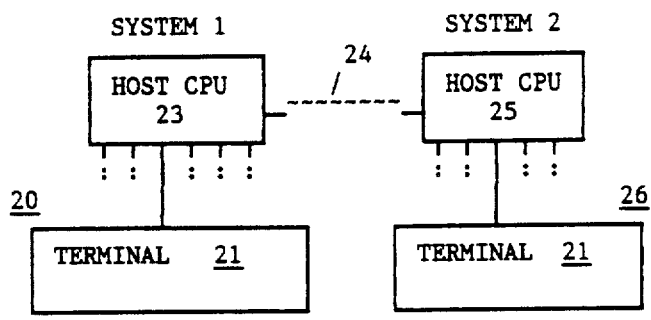
FIG. 1 is a schematic design of a data processing network.
Figure 2:
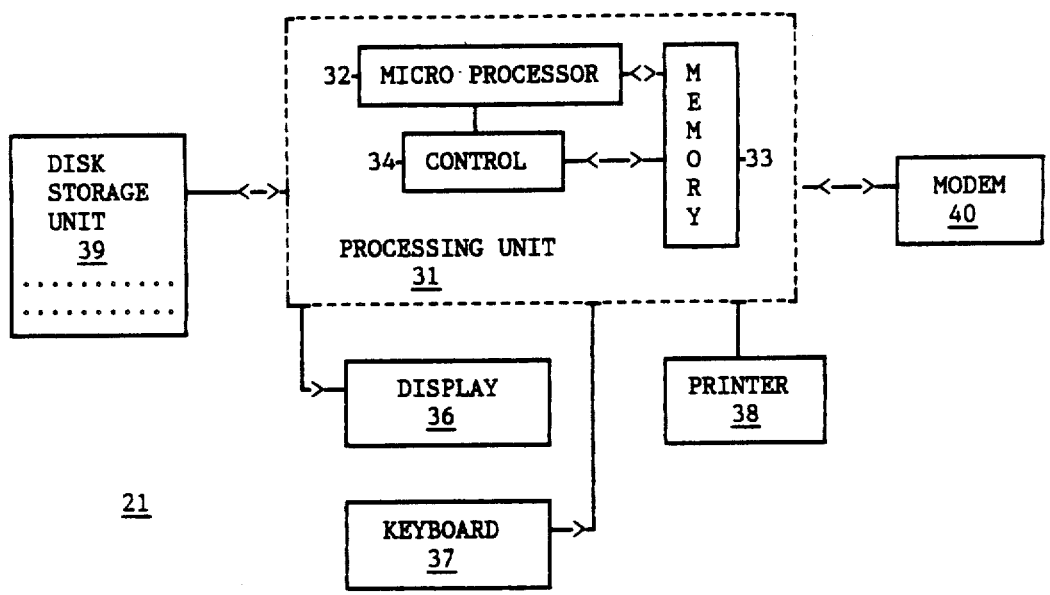
FIG. 2 is a schematic representation of one of the IWS terminals shown in FIG. 1.

FIG. 1 illustrates an information handling system comprising an SNA network 20 of interactive type terminals or Intelligent Work Stations (IWS) 21 of the type shown in detail in FIG. 2. As described, the network includes a plurality of terminals 21 which are interconnected to a host central processing system 23. As shown in FIG. 1, host 23 in turn is connected by communication link 24 to a host processing system 25, which also connects to another SNA network 26 of interactive terminals 21. Functionally, the system operates to allow each terminal or end user to communicate with the host and to one or more other terminals or users using established SNA communication protocols so that the various serially connected communication links are transparent to the users.

The host system includes a host processing unit which may by way of example be an IBM 370 system. A virtual machine type operating system, such as the IBM VM Operating Systems, is assumed in the description of the preferred embodiment.

It should be assumed that the SNA network shown in FIG. 1 supports two distributed applications referred to as "MAIL" and "CALENDAR" which are available to each terminal user. The MAIL application program allows a user at one terminal to generate a document such as a letter and send that letter to one or more other users at a designated nodes on the network. The sender can store the document in the host system at some logically central system location. Each addressee of the letter has the capability of retrieving that document at a later time by also using the MAIL application program from his terminal. The CALENDAR application functions to maintain an electronic calendar for each terminal user. The CALENDAR application, for example, allows one end user to view other end users' calendars prior to scheduling a meeting in order to determine free periods of those persons being invited to the meeting. Such systems are well known in the art and are currently an extensive commercial use. Since the general organization and operation of such distributed applications is well known, only those details that are necessary for an understanding of the method of processing data in distributed application programs of the present invention will be described.

It should therefore be assumed in the following description that each workstation on the network is an Intelligent Work Station such as an IBM PS 2 personal computing system employing a multitasking operating system such as the IBM OS/2 Operating System. It may be further assumed that conventional SNA services to support Logical Unit type LU 6.2 for distributed applications are provided by the system. The terminal shown in FIG. 1 may therefore process two distributed application programs such as MAIL and CALENDAR concurrently.

FIG. 2 illustrates the functional components of one of the interactive type data processing terminals 21, shown in FIG. 1. The terminal comprises a processing unit 31, which includes a microprocessor block 32, which is, for example, an Intel 80386 micro-processor, a semi-conductor memory 33, a control block 34 which functions to control input-output operations in addition to the interaction between the microprocessor block 32 and the memory unit 33.

The terminal further includes a group of convention peripheral units including a display device 36, keyboard 37, printer 38, a storage unit 39, and modem 40. Since the details of the above described functional blocks form no part of the present invention and can be found in the prior art, only brief functional description of each block is set forth along with the description of their interaction, sufficient to provide a person of ordinary skill in the art with the basis of understanding applicant's improved method of processing distributed application programs concurrently.

Processing unit 31 corresponds, for example, to the system unit of an IBM personal computer such as the IBM PS/2 model 80 system. Unit 31 is provided with an operating system program which may be the IBM multi-tasking OS/2 operating system which is normally employed to run the PS/2 model 80. The operating system program is stored in memory 33 along with the application programs that the user has selected to run. When the system supports a distributed application program such as MAIL or CALENDAR, only one part, e.g., part A of the distributed application program is stored at the terminal while the other part, part B, is stored at the host system. Depending on the capacity of memory 33 and the size of the application programs, portions of these programs as-needed may be transferred to memory 33 from the disk storage unit 39 which may include, for example, a 40 megabyte hard disk drive and a diskette drive. The basic function of storage unit 39 is to store programs and data that are employed by the system and which may readily be transferred to the memory unit 33 when needed. The function of the diskette drive is to provide a removable storage function of entering programs and data into the system and a vehicle for storing data in a form that is readily transportable for use on other terminals or systems.

Display 36 and keyboard 37 together provide for the interactive nature of the terminal, in that in normal operation the interpretation that the system gives to a specific keystroke by the operator depends, in substantially all situations, on what is being displayed to the operator at that point in time.

In some situations the operator, by entering commands into the system, cause the system to perform a certain function. In other situations, the system requests the entry of certain data generally by displaying a prompt type of menu/message screen. The depth of the interaction between the operator and the system varies by the type of operating system and the application program, but is a necessary characteristic of terminals on which the method of the present invention may be employed.

The terminal shown in FIG. 2 further includes a printer 38, which functions to provide hard copy output of data. Lastly, the modem 40 functions to transfer data from the terminal 21 of FIG. 2, to a host system through one or more SNA communication links.

FIG. 3 shows the various layers of programming that are employed in an SNA type network. The SNA programming environment is generally considered to consist of seven layers as shown. The top layer as shown is the End User layer and consists of the end user programs. The second layer is called the NAU Services. These services include, for example, presentation services, terminal services and formatting data for specific applications. The third layer is referred to as Data Flow Control. Its function is to maintain send/receive modes and perform high level error correction. The fourth layer is the data Transmission Control layer. Its function involves such things as encryption and decryption plus session level pacing. The fifth layer is the Path Control which does routing, segmenting data units and virtual route pacing. The Data Link layer is the sixth layer. It functions to provide link level addressing, sequencing and error control. The seventh and last layer is the Physical layer which defines for example the pin assignments on connectors for the various signals.

Figure 4A:
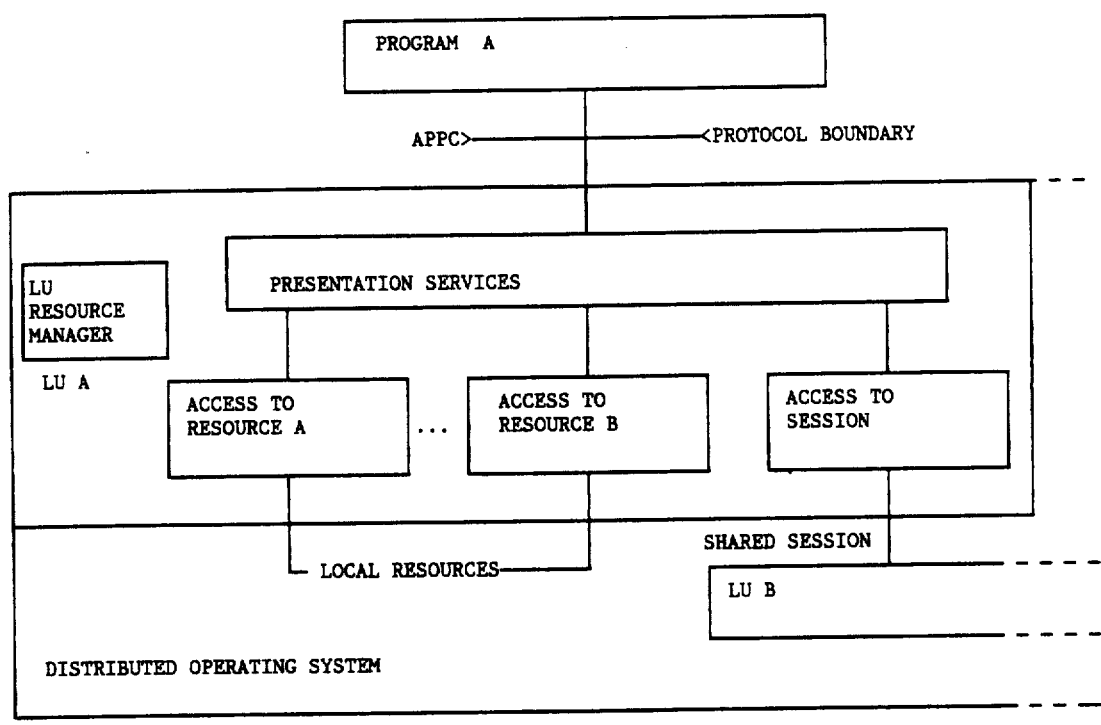

APPC defines the NAU services, Data Flow Control and Transmission Control. As explained on page 306 of the previously referenced IBM Systems Journal, the method of defining the LU 6.2 conversation functions, is in terms of programming-language-like statements called verbs. Documentation with verbs which are completely defined by the procedural logic that generates session flows, provides significantly greater precision than English prose. FIG. 4A shows how the verbs define the interaction between transaction programs, i.e., Part A or Part B of the distributed application, and Logical Units for conversation resources. A set of verbs is referred to as a protocol boundary rather than as an application program interface.

As shown in FIG. 4A, the presentation services component interprets verbs and can be thought of as including a subroutine for each verb. The LU resource manager does allocation of conversation resources and assignment of conversations to the sessions, keeping queues of free sessions and pending allocation requests. Its equivalent component in products also allocates local resources in products specific ways. The function of the following LU 6.2 verbs is set forth on page 307 of the previously mentioned IBM System Journal. The 6.2 verbs discussed are one, SEND_DATA, RECEIVE_AND_WAIT, PREPARE_TO_RECEIVE, FLUSH, REQUEST_TO_SEND, SEND_ERROR, CONFIRM, ALLOCATE AND DEALLOCATE.

The ALLOCATE verb initiates new activity at another LU by building a conversation to a named partner program. The named partner is placed in execution and given addressability to the conversation that started it. The ALLOCATE verb carries several parameters including the following.

1. LU_NAME. This is the name of the LU at which the partner program is located.

2. TPN. TPN is the Transaction Program Name of the partner program with which the conversation is desired.

3. MODE_NAME. MODE_NAME specifies the type of transportation service that the conversation is to provide. For example, a SECURE, a BULK, or a LOW_DELAY conversation can be requested. The LU uses a session with the appropriate MODE_NAME to carry the conversation.

The target of the conversation is a newly created process or task, which means that the distributed processing in the network at any instant of time, consists of a number of independent distributed transactions, each of which consists of two or more transaction programs connected by a conversation. The DEALLOCATE verb ends the conversation. In as much as each partner may issue DEALLOCATE, a conversation varies from a single short message to many exchanges of long or short messages. A conversation could continue indefinitely, terminated only be a failure of a Logical Unit or by the session that carries it. Transaction programs are not ended by DEALLOCATE, but continue until they terminate their own execution, end abnormally or are terminated by control operator action.

Both network application programs and service transaction programs use the execution services provided by Logical Units. Service transaction programs run on Logical Units in the same way as other transaction programs. They interact with the human operator or they may run as a pure programmed operator. Many service transaction programs effect only the local Logical Unit. An example is a command to display the current set of active transaction programs.

Other control transactions, especially those that relate to sessions, can effect other Logical Units as well as applications at other Logical Units. For example, a local command to prematurely terminate a transaction that is using a conversation causes the conversation to be ended abnormally, a state change that must be transmitted to the partner Logical Unit for presentation to the transaction program that is sharing the conversation. Or a decision to activate one or more of the sessions shared by the two LUs may be made by one LU operator but must be communicated to the other Logical Unit. Advanced program to program communication for SNA includes several control operator verbs that provide LU to LU control and coordination, especially for activation and deactivation of sessions. When a distributed service transaction program starts at one LU, it creates a conversation to a partner transaction program in a partner LU. The two transaction programs then cooperate to preform the desired control activity.

The IBM VM host operating system includes a component referred to as APPC/VTAM Services (AVS) which is responsible for the APPC protocol boundary support in the Operating System. AVS defines one more LU 6.2 Logical Units to IBM Virtual Telecommunications Access Method (VTAM). VTAM is the IBM host computer component that manages the communications layer between the host and the various terminals of the network. AVS acts as a bridge for APPC communications to virtual machines within the operating system. For example, when an APPC ALLOCATE verb is received that originated from outside the VM operating system, VTAM will determine if there is a Logical Unit active that corresponds to the LU name specified in the ALLOCATE. AVS will have previously told VTAM that it will handle all traffic for particular LU names. VTAM will find that AVS has defined an LU that corresponds to the LU name in the ALLOCATE verb and pass the ALLOCATE verb to AVS.

There is additional information supplied with the ALLOCATE verb that is used in this process. Included in the ALLOCATE is a User ID, the identification of the user that the allocate was submitted in behalf of, and a Transaction Program Name (TPN). The TPN is the application program to be invoked, that is the Part B of the distributed application such as MAIL. At the time AVS receives the ALLOCATE, it will create a virtual machine and pass the transaction program named in ALLOCATE to an operating system component that is resident in the virtual machine. The operating system component in the virtual machine will activate the named application and interaction can occur between the Part A and Part B of the application.

FIG. 4A and 4B are similar to the representation of the SNA programming environment shown in FIG. 3 and represent the SNA/APPC programming environment in which the method of the present invention is advantageously employed.

The IWS is provided with a programming organization which allows the terminal to run two application programs concurrently. An article entitled "Multiple Tasks" beginning on page 90 of Volume 5, Number 11, of the PC Tech Journal, published November, 1987 explains in detail the IBM OS/2 multi-tasking capabilities.

In the previous example, when the same terminal initiates a second distributed application program, it will be assigned the same virtual machine that has been created for the first distributed application program. As a result, the two application programs running on the host virtual machine become serialized, which defeats the overall purpose of providing an operating system at the terminal that is capable of multi-tasking operations.

Figures 5, 6:
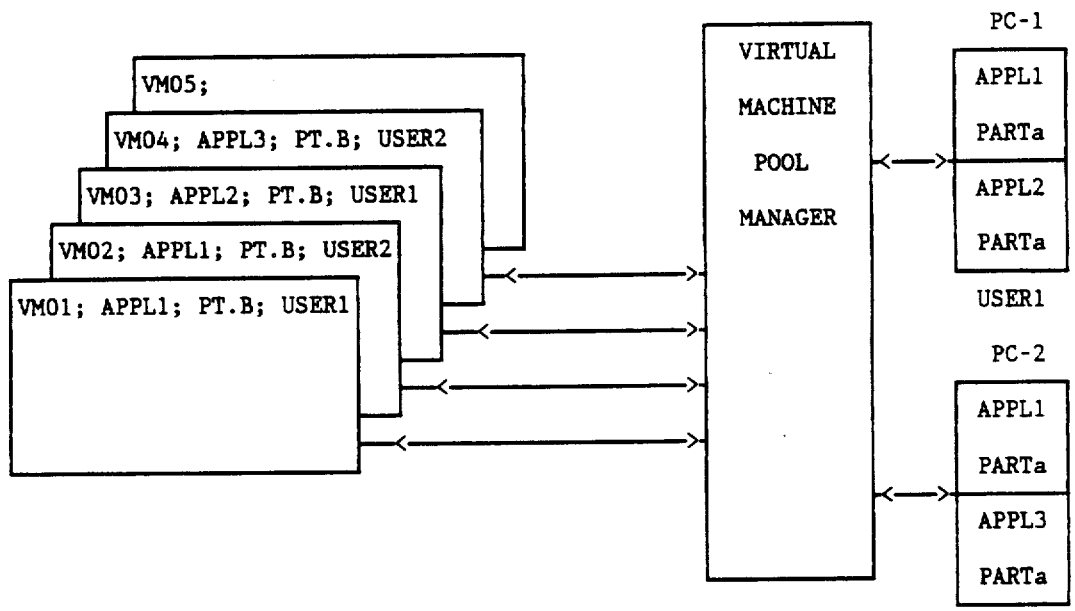
FIG. 5 is a schematic representation of the pool of run ready virtual machines that are created at the host processor.
FIG. 6 illustrates the details of the Virtual Machine Pool Data Structure that is employed the by the Pool Manager in managing the pool of virtual machines shown in FIG. 5.

In accordance with the method of the present invention, an additional function referred to as a VM Pool Manager (VMPM), shown schematically in FIG. 4B, has been added to the Protocol Boundary services of the prior art. The VMPM operates in the same virtual machine as does the Protocol Boundary services, which in the IBM Vm operating system is called the AVS module. When activated, the VMPM will read a set of installation supplied parameters and create a plurality of virtual machines as shown in FIG. 5, that are brought to the run ready state. Included in these parameters are generic names of the virtual machines to be created in the pool. The names or virtual machines IDs will previously have been defined in the Operating System's directory of virtual machines. The VMPM issues an Autolog macro for each of the machines. The Autolog macro is a known function in the VM operating system. When issued for a particular virtual machine, it will result in that machine being created and placed in a state such that it is waiting for work, in this case waiting for an APPC ALLOCATE verb to be passed from AVS.

As each machine is successfully created by the Autolog macro, the VMPM will create an entry in a VMPM data structure shown in FIG. 6 representing that virtual machine and its state, in control blocks that are owned by the VMPM. When all virtual machines in the list have been created, the VMPM will return control to the AVS. After the virtual machines have been created and the pool manager has returned control to the AVS, the following scenario occurs.

The terminal operator interactively enters information into his terminal to invoke the distributed application program Mail. As a result of that, the "A" part of the Mail distributed application issues the ALLOCATE verb including the following parameters LU name=LU 1,
TPN=MAIL,
USERID=DICKC.

When VTAM receives the ALLOCATE verb, it sees that an LU named LU1 was defined by AVS and it passes the allocate to AVS. AVS sees that LU1 is associated with the pool manager by scanning the pool manager data structure. It therefore activates the pool manager component of AVS and passes the ALLOCATE information to it. The second function of the pool manager is to scan its control block entries that represent virtual machines in the VM pool and look for one that is available for work. When it finds an available virtual machine, it changes the ALLOCATE parameters to the following:

LU NAME=VM01,
TPN=MAIL,
USERID=DICKC.

The pool manager changes the LU name to the name of the virtual machine in the pool. The pool manager also updates the control block entry that represents the virtual machine to show that it is no longer available. The pool manager then places information into the control block entry that reflects what the virtual machine is busy doing. The pool manager then re-issues the ALLOCATE verb with the changed LU name.

The VM operating system will then pass the ALLOCATE to the operating system code resident in the selected virtual machine. That code then activates the application part B named in MAIL and switches the ID of the virtual machine to the ID specified in the allocate verb which, in this case, was DICKC. A conversation is then conducted between part A and part B of the MAIL distributed application program. Similar interactions of the type described above can occur concurrently from a single multi-tasking PC or from multiple PCs. When the part A and part B complete their interaction, either may issue an APPC DEALLOCATE verb to end the conversation. When a DEALLOCATE verb is received, AVS will invoke the pool manager and it will change the control block entry that represents the virtual machine that was involved. The pool manager will change the status of the virtual machine to an available state. It will be seen that in accordance with the above process, a single conversation defined by an ALLOCATE and a DEALLOCATE is handled by an assigned virtual machine from the pool of virtual machines under the control of the pool manager. The next conversation would undoubtedly be assigned to a different virtual machine from the pool. As a result, two distributed application programs that are being run concurrently from a single terminal with a single user ID are assigned by the VMPM, in accordance with the new method, to different VM machines that were created earlier by the virtual machine pool manager.

Figure 7:
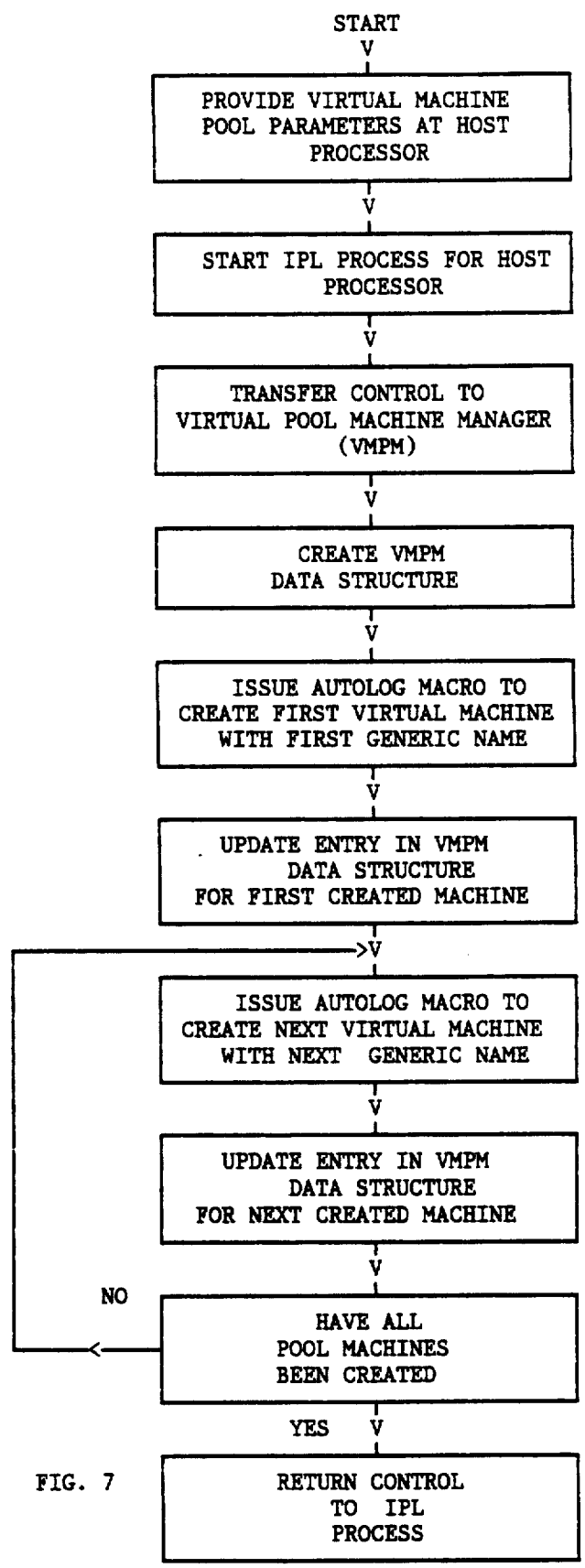
FIG. 7 is a flow chart setting forth the steps involved in creating the pool, of virtual machines shown in FIG. 5.
Figure 8A:
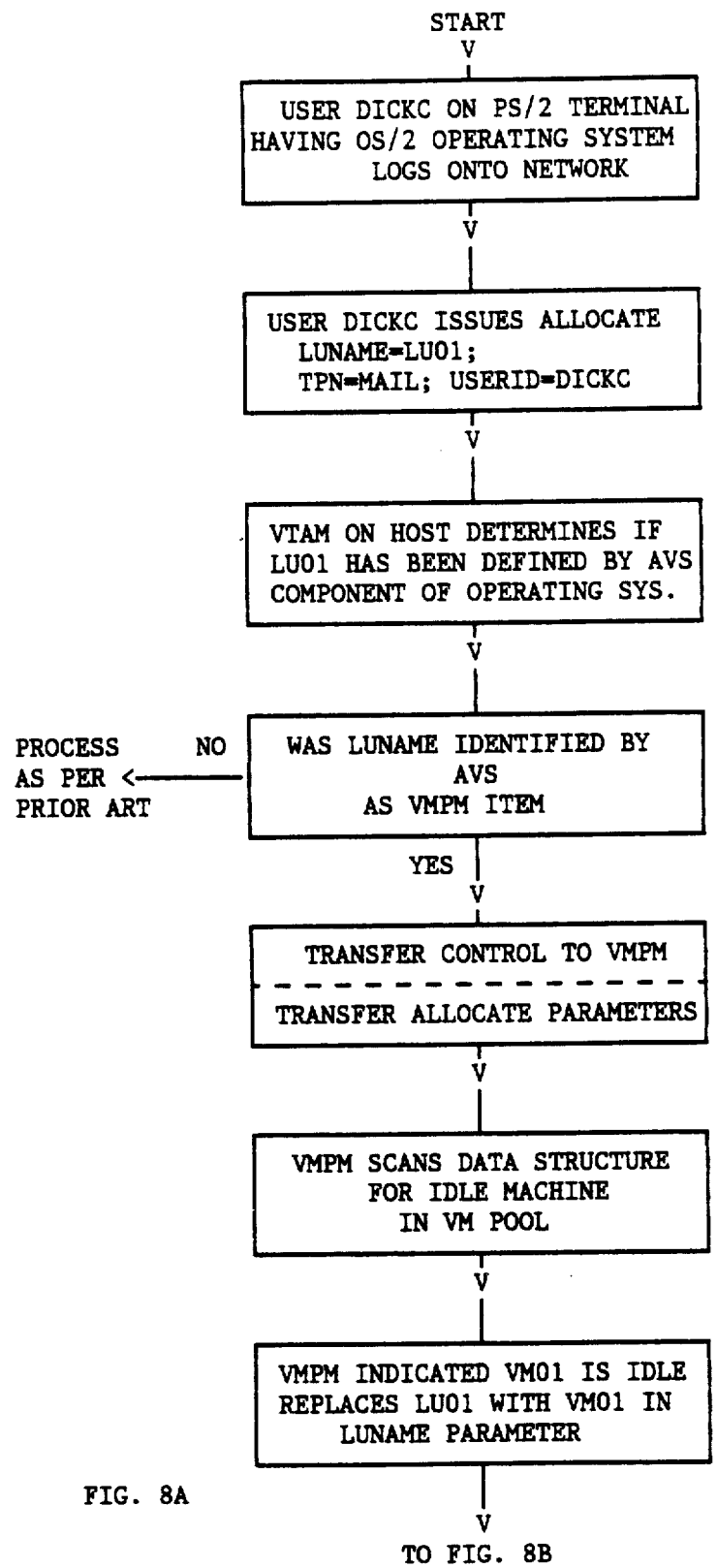
FIGS. 8a and 8b are flow charts setting forth the steps involved by the Pool Manager in executing a distributed application program in accordance with the new method.
Figure 8B:
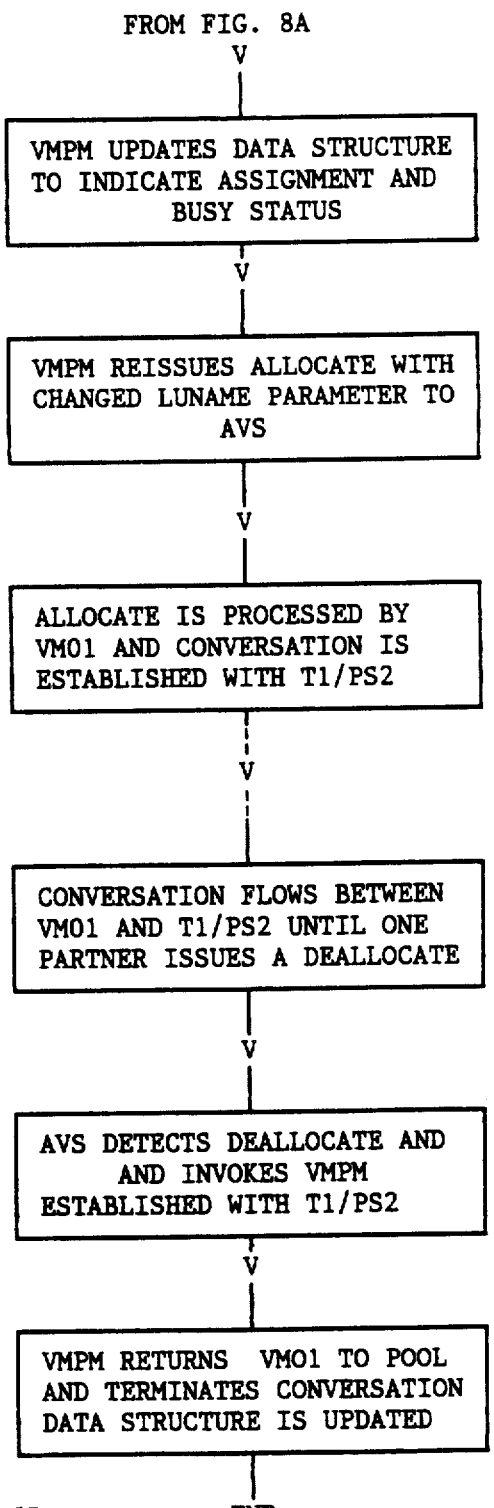

While the above described new method avoids the problem that exists in prior art systems where two distributed application programs originating from the same terminal with the same user ID become serialized within one virtual machine at the host system, it requires that a new method be developed to recognize the current terminal address of a system user since a user is no longer assigned a dedicated virtual machine by a Log On process. Prior to describing the new method, the steps involved in creating the virtual machine pool at the host processor when the host system is initially IPLed as described above may be briefly reviewed by reference to the flow chart of FIG. 7 which summarizes these steps. Similarly, the steps involved in the program to program communication process discussed above may also be briefly reviewed by reference to the flow chart of FIG. 8 which summarizes that process.

The term "distributed application program" has been used in the above description with reference to a pair of programs that have been coded to communicate with each other using APPC verbs. One program executes on a terminal while the other executes on the host. The program that issues the first Allocate verb to initiate a conversation request is sometimes referred to as Part A of the distributed application program while the program addressed in the request has been referred to as Part B of the distributed application program. The term "transaction program" has been used with reference to either Part A or Part B of a distributed application program.

In accordance with the new method, since the terminals on the network are intelligent work stations, such as personal computers (PC), which are capable of doing useful work for a user without ever communicating with the host processor, the option is given to the system user to identify the current terminal address where communication with the user may occur. At the time that the user decides to establish communication with the host, a PC distributed application program is evoked by the user. Part A of the program is resident on the PC and functions to establish an LU 6.2 conversation with its Part B counterpart that is resident at the host processor. Part A presents a panel on the screen of the display device to the user after the program is evoked which prompts the user for predetermined information as to the identity of the user and then develops the data required by the ALLOCATE verb that is sent to the host processor. The USERID of the user is entered along with the password of the user. The Part A of the program issues an ALLOCATE to establish a conversation with Part B. It is assumed that the Part B name is BEGIN and the Host is named LU1. The ALLOCATE would take the form shown below;

```
ALLOCATE  TPN=BEGIN
          USERID=DICKC
          PASSWORD=ABCD0001
          LUNAME=LU1
```

Figure 9:
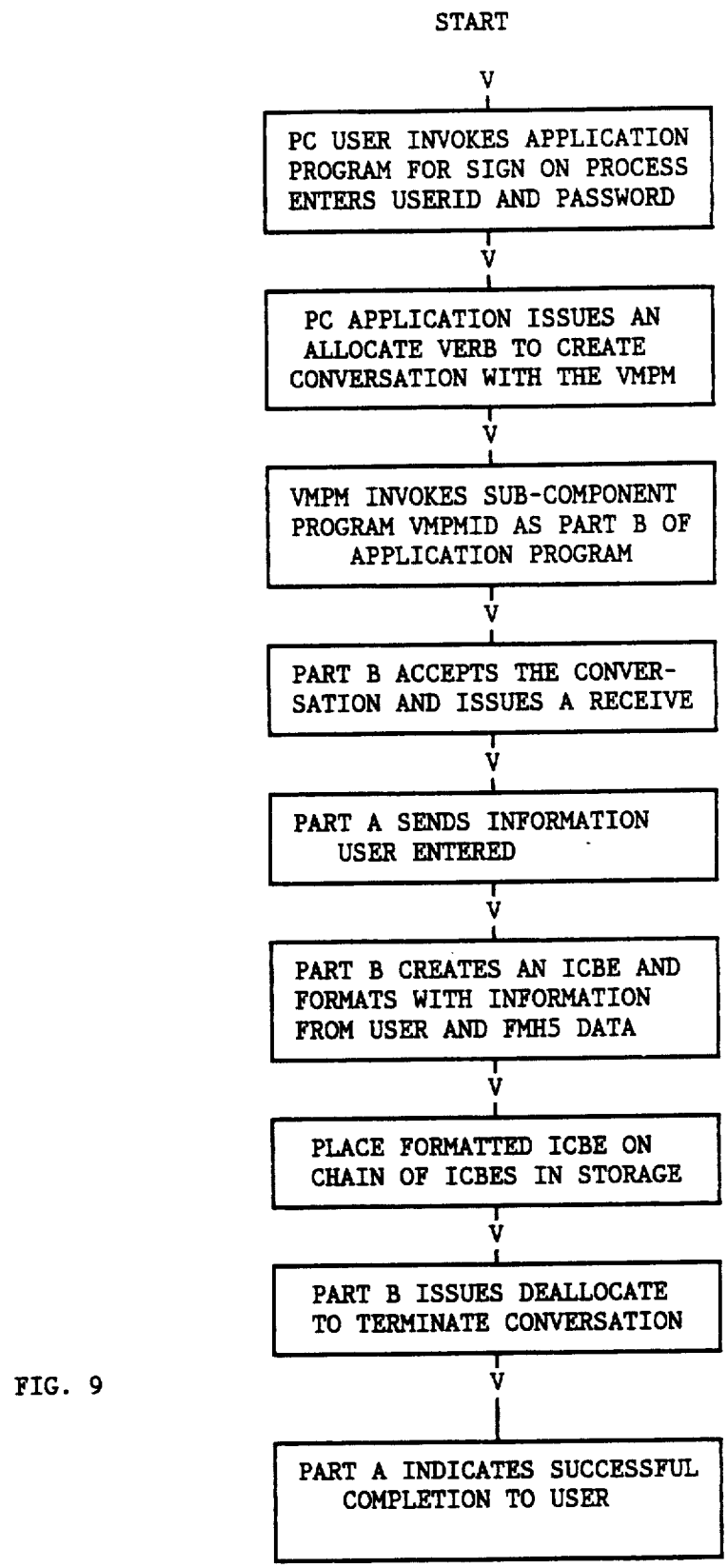
FIG. 9 is a flow chart setting forth the steps involved in advising the host processor of the current terminal address of a system user.

When the ALLOCATE is received at the Host LU1, the AVS component of the VTAM services forwards the Allocate on to the Virtual Machine Pool Manager since it understands that the VMPM has jurisdiction over the transaction program BEGIN. The VMPM has a sub component program BEGIN which creates the Identification Control Block Entry data structure shown in FIG. 10, and then stores the USERID from the ALLOCATE and the terminal ID, PCID, from the Function Management Header 5 (FMH 5) which is a set of control information that accompanies each ALLOCATE verb. The Begin program then places the ICBE into a chain of ICBEs that are located in a portion of the storage area of the host that is available to all of the programs that are run under the control of the VMPM. The pointer field of the next previous ICBE is updated to point to the location of the newly created ICBE after which a DEALLOCATE is issued to terminate the conversation. The host processor now understands the current terminal address of the user since the ICBE relates USERID to PCID. The steps of the above Sign On process are similar from an external appearance to the Log On process of the prior art in that the user enters a USERID and a Password. In substantially all other aspects, the two processes are different as to the interactions that occur at the host. FIG. 9 is a flow chart that summaries the steps involved in the Sign On process.

Figures 10, 11:
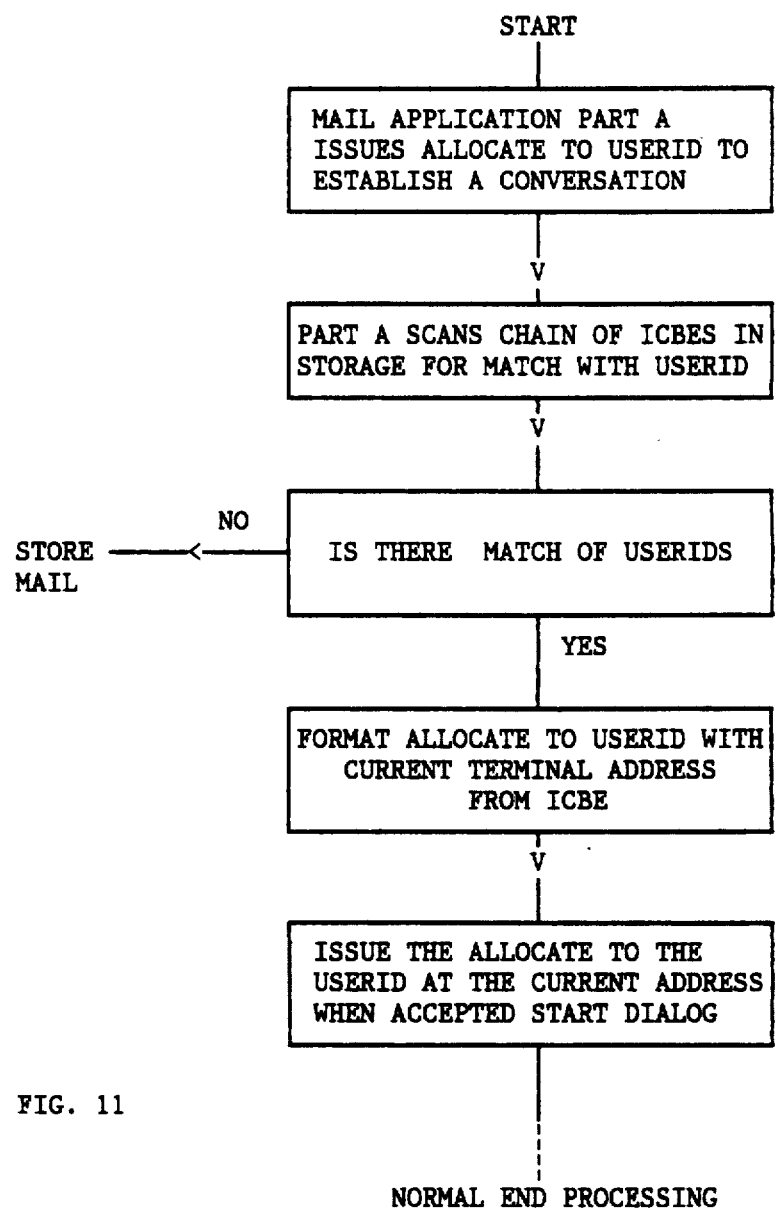
FIG. 10 illustrates the Identification Control Block Entry (ICBE) data structure that is created to store the current terminal address of an online system user.
FIG. 11 is a flow chart setting forth the steps involved when the host processor attempts to initiate an LU 6.2 conversation with a system user.

Any distributed application that issues a request for a conversation with USERID is serviced by the VMPM. Since the ALLOCATE that represents this request carries the USERID name of the addressee, the VMPM firsts scans the chain of ICBEs located in storage looking for a match with the USERID contained in the ALLOCATE. When the match is found, the related PCID is used to forward the ALLOCATE to the correct terminal where it is accepted and processed in the normal way. FIG. 10 summarizes the steps of the above described process.

Figure 12:
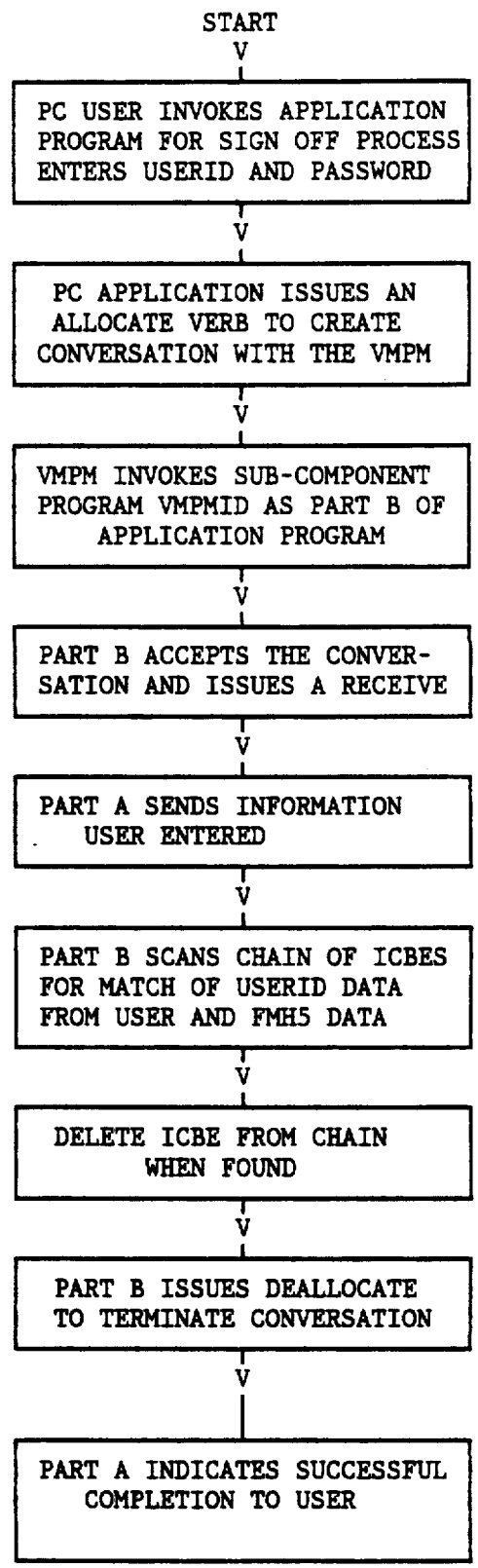
FIG. 12 is a flow chart setting forth the steps involved when an online user decides not to receive any further conversations with the host processor.

When USERID decides that communication with the host processor and other terminal users is no longer required or desired, a PC application program is evoked by the user. The application program presents a screen to the user which prompts him for the desired action and data necessary to cancel his current terminal address. The application program then issues an ALLOCATE to the host processor LU1 for a conversation with the Part B counterpart transaction program called END. On receipt at the host the AVS component of the VTAM services program determines that the TPN called END is run under the control of the VMPM and passes the ALLOCATE on to the VMPM where a sub-component program functions to erase the ICBE which stores the USERID contained in the ALLOCATE. After the ICBE containing the USERID is deleted from the chain of ICBEs, the END program issues a DEALLOCATE to terminate the conversation. The current terminal address of USERID is thereafter unknown to the system. USERID may still execute programs on the PC that do not require any interaction with the host. FIG. 12 summarizes the steps involved in deleting USERID's current terminal address from the system.

While the invention has been shown and described with reference to the preferred embodiment, it should be understood by those persons skilled in the art that changes and modifications may be made without departing from the spirit of the invention or the scope of the appended claims.

I claim:

1. A method for controlling the processing of host originated conversation requests for known Users of an SNA type network that processes distributed application programs in accordance with LU 6.2 protocols in which a conversation is selectively established between portions of a distributed application program, one portion being stored and executed at one of plurality of Intelligent Work Stations (IWSs) which is selectively connectable to said network and another portion being stored at a host processor, said processor having a Virtual Machine Pool Manager (VMPM) for creating a pool of virtual machines and for managing the assignment of each machine to process the said another portion, said assignment being terminated and said assigned virtual machine being returned to said pool at the time that a processed conversation is terminated, said method preventing a host originated conversation request addressed to a first user having a specific USERID from being processed by an assigned virtual machine unless specifically authorized by said first user designating the ID of one said IWS to which said host originated conversation requests are to be sent, while permitting a conversation request by said first user originating from an IWS to be processed by a virtual machine assigned by said VMPM, said method comprising the following steps,
  (A) providing a second distributed application program having one portion resident at said first IWS and the counterpart portion resident on said host to authorize the processing by an assigned said virtual machine of host originated conversation requests addressed to said first user,
  (B) invoking at said first IWS said one portion of said second application program to transmit an ALLOCATE verb requesting a conversation with said counter part portion, said ALLOCATE verb including said USERID and the ID of said first IWS at which said first user is currently located,
  (C) processing said ALLOCATE conversation request at said host including the steps of,
    (1) creating an Identification Control Block Entry (ICBE) data structure for storing the said USERID of said first user and said first IWS ID, and
    (2) appending said ICBE onto a chain of ICBEs at a location in storage that is accessible to each said virtual machine to permit said first IWS ID and said first USERID user to be determined by each virtual machine assigned to process a host originated request for a conversation with said first USERID,
  (D) processing with an assigned virtual machine a host originated request for a conversation with said first USERID, including the step of
    (1) scanning said chain of ICBEs to determine the IWS ID at which said specified User is currently located, and
    (2) transmitting said request only if said IWS ID is determined in said step of scanning.

2. The method recited in claim 1 including the further step of,
  (A) storing in said ICBE data transferred to said host with said ALLOCATE to relate said first USERID and the IWS ID that issued said ALLOCATE verb.

3. The method recited in claim 2 including the further step of,
  (A) issuing a DEALLOCATE verb to said first IWS ID from said host to terminate said conversation.

4. The method recited in claim 1 in which said step of processing includes the further steps of,
  (A) issuing an ALLOCATE verb at said host, requesting a conversation with said first USERID, and
  (B) determining if said first USERID is accepting conversation requests by,
    (1) scanning said chain of ICBEs for an entry containing said first USERID, and
    (2) transmitting the ALLOCATE verb to IWS ID stored in the ICBE containing said first USERID when said USERID is found by said scanning step.

5. The method recited in claim 4 including the further step of,
  (A) terminating said step of processing when said step of scanning determines that said first USERID has not been stored in a scanned ICBE.

* * * * *